(12) United States Patent
Ozaki

(10) Patent No.: US 8,013,902 B2
(45) Date of Patent: Sep. 6, 2011

(54) CAMERA SYSTEM APPARATUS WITH IMAGE SENSOR

(75) Inventor: Nozomu Ozaki, Kanagawa (JP)

(73) Assignee: Sony Taiwan Limited, Taipei (TW)

( * ) Notice: Subject to any disclaimer, the term of this patent is extended or adjusted under 35 U.S.C. 154(b) by 703 days.

(21) Appl. No.: 11/315,388

(22) Filed: Dec. 22, 2005

(65) Prior Publication Data

US 2006/0139460 A1 Jun. 29, 2006

(30) Foreign Application Priority Data

Dec. 24, 2004 (TW) .............................. 93140598 A

(51) Int. Cl.
*H04N 5/235* (2006.01)
*H04N 5/228* (2006.01)
*H04N 9/73* (2006.01)

(52) U.S. Cl. ................ 348/222.1; 348/221.1; 348/223.1; 348/224.1; 348/229.1

(58) Field of Classification Search ................ 348/221.1, 348/207.1, 207.11, 241; 352/44
See application file for complete search history.

(56) References Cited

U.S. PATENT DOCUMENTS

| 7,663,670 B1 * | 2/2010 | Orboubadian ............. 348/231.2 |
| 2003/0095197 A1 * | 5/2003 | Wheeler et al. ............... 348/241 |

* cited by examiner

*Primary Examiner* — Sinh Tran
*Assistant Examiner* — Selam Gebriel
(74) *Attorney, Agent, or Firm* — Frommer Lawrence & Haug LLP; William S. Frommer; Thomas F. Presson

(57) ABSTRACT

A camera system apparatus that includes an image sensor unit and an AFE unit for digitizing an analog output signal output from the image sensor unit into an digital video signal. A front end camera DSP unit, including a camera signal data path for accepting the digital video signal, and a measure unit operably connected to the camera signal data path for measuring picture characteristics or extracting picture parameters. A DSP unit processes the picture characteristics measured by the measure unit as parameters for initial camera control, and a parameter register into which the parameters are set to control the camera signal data path. A back end processor unit to which a video signal output from the camera signal data path is input, the back end processor including a general application process unit for processing the video signal and a scene analyzer operably connected to the general application process unit for precise camera processing.

19 Claims, 5 Drawing Sheets

CAMERA SYSTEM APPARATUS WITH IMAGE SENSOR

BACKGROUND OF THE INVENTION

1. Field of the Invention

This invention relates to a camera system which is composed of an image sensor unit and a camera DSP. This invention realizes a high-level and intelligent camera system with scene analysis and classification with keeping flexibility of system configuration for system requirement and future expandability.

2. Description of Related Art

The existing camera unit is composed of the image sensor such as CCD (charge coupled device) or CMOS imager, AFE (Analog Front-End), and camera DSP. In this camera DSP, the basic camera related functions such as Auto White Balance (AWB) for changing color according to the color environment for better color quality. Auto exposure (AE) for fitting to light exposure condition, and Auto Focus (AF) to adjust the focus to the on-focus position for a certain object are processed. In addition to these functions, several other functions are needed to be processed on camera DSP. The camera DSP is divided into two major parts, one is the dedicated hardware block for data path part in which there are filters and other hardware processor units. And also the dedicated hardware block has some kind of measuring unit which extracts some kind of parameters related to the feature of picture for the sake of camera process controlling. The other part on camera DSP is the processor part, which is realized as DSP (Digital Signal Processor) or on-chip CPU The DSP/CPU is usually used for sequence control, adaptive control and some judgment for camera processing control. The DSP/CPU gets parameters from the measuring unit and calculates and selects parameters which will be set into the parameter register of hardware block to control the process and to adjust the process for better picture quality.

FIG. 5 shows an example of a conventional typical camera system. The reference numeral 1 denotes an image sensor unit, in which CCD or CMOS image sensor is usually used. In FIG. 5, this image sensor unit also includes lens module with focus control function and iris for exposure control function. The signal 8 is the control signal for focus motor and iris actuator and son on. The analog output signal 2 from image sensor unit 1 is input to AFE 3 to convert an analog video signal 2 into a digital video signal 4. The digital signal 4 is the input to the front-end camera DSP 5, and is input to the camera signal data path 10. In the camera signal data path 10, some feature values are extracted with the measure unit 11. These feature values are sent to DSP 12 and are used for estimation of parameters to be set into the parameter register 13. The values in parameter register 13 are used to control camera signal data path's operation. The digital video signal 4 is processed at the camera signal data path 10 and the result is output as a video signal 6 and is sent to a next stage. For some application such as cellular phone, one of the common functions of the back-end functions is the image compression. In this case, the video signal 6 is the input of conventional processor 7 and is encoded to a compressed data signal 9.

One of the conventional camera system's typical characteristics is that the camera DSP is a stand-alone type. This means there is no strong cooperation with the back-end processor for camera processing. The front-end camera DSP is doing all of camera processing and will output the processed video signal. The back-end block will not cooperate with front-end camera DSP, and the back-end processor just uses the output from the front-end camera DSP. Only the initial setting of the register is done by an external host processor or a back-end processor. However, there is no feedback from the back-end processor to control the front-end camera DSP unit. This makes easy to use camera font-end DSP since it works independently for a stand-alone function. However, it is difficult to integrate powerful function into camera DSP because of limited DSP's performance and limited memory size of camera DSP.

Some of the processes on a camera system are strongly scene dependent. In AWB case, for instance, the best condition of AWB is completely different between in an outdoor and in an indoor situation. The camera system extracts some kind of parameters to judge if the scene taking is indoor or outdoor. Sometimes, however, the judgment becomes wrong because of an unexpected scene in developing phase of AWB algorithm in advance. These misunderstanding of situations make image degrading into strange color and irrelevant color.

To avoid these situations, camera DSP has been implemented so as to cover a diversity of situations with adding special conditions into judging algorithm. But as there are so many situations in real operation, it is impossible to cover all situations by just adding special conditions to the algorithm. And since there are also the limitations of memory on chip, DSP's performance limitation and so on, it is difficult to realize these complex algorithms with small camera DSP unit.

These situations are the same as those for other camera processes. In AF case, without any information about an object to be focused and its position in a picture, focusing on this object is very difficult. If the object is set in the center of a camera scene, it is relatively easy to focus on it. But if the position of the object is not in the center of a picture, AF system cannot detect the object to be focused and therefore, it is impossible to focus on it.

For AE case, the situation is almost the same. When the scene is in a backlight condition for example, it is hard to properly adjust the exposure to realize a good picture quality.

For the camera processing, basically very high performance of the DSP or CPU in the camera DSP unit is needed for judging the situations of scenes because the conventional system with limited DSP/CPU power cannot realize scene dependent processing properly.

SUMMARY OF THE INVENTION

The object of this invention is to propose a camera system which can use sophisticated algorithm in order to realize an intelligent camera system. With this invention, the camera can use powerful processor's power of back-end processor, and can realize scene dependent process collaborating with the front-end camera processor.

This invention can be used for any kinds of camera systems which have the system configuration of the imager as an input for video or image, the camera processing unit (camera DSP), and the back-end processor for application function for the system. Therefore, the application of this invention covers from the small mobile products such as cellular phone with camera, PDA with camera, DV camcorder, digital still camera, MPEG-4 digital movie camera, and to the professional TV camera system. The inventive idea is basically applied to all these kind of products.

As described above, the most important point for next generation camera system is the capability of proper process on camera system, depending on scene of camera picture. If the camera system can understands the scene taken, the camera process will change dramatically and the picture quality will change as well. The camera system can adjust parameters as fitting to the scene taken, and this will improve the picture quality indeed.

Conventional systems cannot conduct a scene analysis and scene understanding because of the limitation of performance of camera DSP.

This invention provides the camera system which is able to process sophisticated process such as scene analysis and understanding of scene with the non-high performance camera DSP which is as same as conventional camera system, with using powerful back-end processor in order to analyze scene and feedback the result of the scene analysis to the front-end camera unit to realize proper picture.

DETAILED DESCRIPTION OF THE INVENTION

Figure 1:
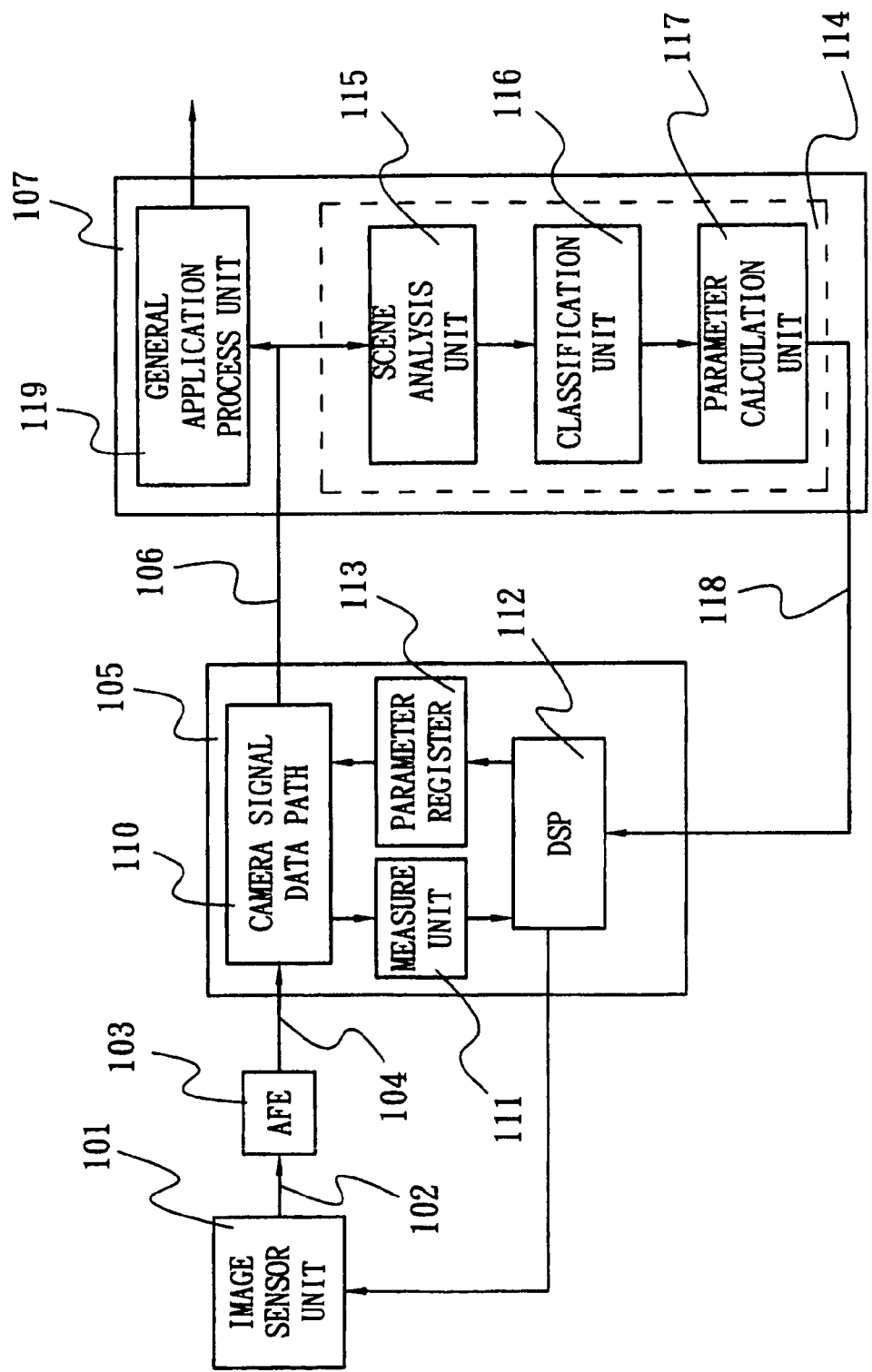
FIG. 1 shows a configuration of a camera system according to a first embodiment of the present invention.

FIG. 1 shows a configuration of a camera system according to a first embodiment of the present invention. The system is composed of an image sensor unit 101 such as CCD image sensor or CMOS image sensor, and the front-end camera DSP unit 105 which has been changed to realize the invented functions, and the back-end processor unit 107. In addition, sometimes there is a small component such as AFE (Analog Front-End) unit 103 or TG (Timing Generator) between the image sensor unit 101 and the front-end camera DSP unit 105.

The AFE unit 103 digitizes an analog output 102 into a signal which is 8-bit or 10-bit or more bits as a digital video signal 104. The front-end camera DSP unit 105 includes a camera signal data path 110 for accepting the digital video signal 104, a measure unit 111 operably connected to the camera signal data path 110 for measuring picture characteristics or extracting picture parameters, a DSP 112 for processing the picture characteristics measured by the measure unit 111 as parameters for initial camera control, a parameter register 113 into which the parameters are set to control the camera signal data path 110. The camera signal data path 110 processes pixel data from the image sensor unit 101, and general camera processing such as data transformation, filtering, and basic camera processing of Auto Focus (AF), Auto Emission (AE), Auto White Balance (AWE) and so on. In a conventional camera DSP unit, the data path for these functions has been built with hardwired logic and therefore these systems do not have flexibility to support the versatile situations of scene and additionally lack the chance to add updated technology In the camera system of the present invention, the data path has been made as a general data path to support versatile process including conventional camera process.

The measure unit 111 is operably connected to the camera signal data path 110 for measuring picture characteristics or extracting picture parameters. The digital signal processor (DSP) 112 processes the picture characteristics measured by the measure unit 111 as parameters for initial camera control. The parameters are set into a parameter register 113 to control the camera signal data path 110. A video signal 106 output from the camera signal data path 110 is input to a back-end processor unit 107.

The back-end processor unit 107 includes a general application process unit 119 for processing the video signal 106 and a scene analyzer 114 operably connected to the general application process unit 119 for precise camera processing.

On the back-end processor unit 107, there are two kinds of processes. One is the general application process on the general application process unit 119 as same as the conventional system. One typical example of this conventional application is image compression on video signal from camera for video recording and transferring. The other process is camera processing performed in the scene analyzer 114 of the back-end processor unit 107. The scene analyzer 114 includes a scene analysis unit 115 for extracting information including features, a classification unit 116 operably connected to the scene analysis unit 115 for defining the present scene situation based on the information including features extracted by the scene analysis unit 114, a parameter calculation unit 117 operably connected to the classification unit 116 for calculating the input from the classification unit 116 and sending a signal 118 as parameters to be set into the front-end camera DSP unit 105. The scene analyzer 114 can be realized either with hardware or software. With the powerful DSP or CPU, software realization is better for more flexibility.

The scene analysis unit 115 extracts multi-dimensional features for the scene and outputs a set of features for being used for scene understanding which is useful for camera processing. For example, those multi-dimensional features may be some kind of values related to color in whole picture, or some kind of value which is related to the local area in picture. In the conventional camera DSP unit, the number of the measured features from the picture is limited because of limited performance of camera DSP and CPU. The conventional system cannot use other information to control camera system. With this invention, however, the camera system can use much more DSP/CPU power than the conventional system. Because of this, the camera system can extract more number of features for controlling the camera system. Another example of measured feature is the parameters for Auto White Balance. In the conventional system, the color of picture is averaged through a whole image and gets one value for each color component for the whole image. The data from this color information is usually reduced to two-dimensional space to reduce the number of feature to be handled. Furthermore, in this two-dimensional space, the curve for judgment is approximated by line instead of original curve. With the simplification, the AWB process has been realized on small, not-powerful DSP/CPU in the camera unit.

The output from the scene analysis unit 115 is a set of features which are used for scene understanding. Scene understanding relates to determining if the image of the current scene is of indoor situation or outdoor situation. In the outdoor case, whether there is the sky in the upper part of the picture is checked. In the indoor case, whether there is a human face in the picture is checked. There are so many things related to scene understanding which are useful for camera processing, such as back light condition, strong light spot existence, color light, high emission area and dark area, etc.

The classification unit 116 is used to classify the scene itself with the information from the scene analysis unit 115 by using statistical pattern classification or neural network type decision, and outputs description on the scene which will be input to the parameter calculation unit 117. The statistical classification is also a complicated function which is not realized on the camera DSP. For statistical classification, the system needs to store large pre-loaded data, and also needs much more CPU/DSP power to calculate the distance to classify the scene.

The parameter calculation unit 117 calculates the input form the classification unit 116 and outputs signal 118 as actual parameters which are to be set into the front-end camera DSP unit 105. For example, DSP 112 may accept the signal 118 as parameters output from the parameter calculation unit 117 and sets the parameters into the parameter register 113.

There are several methods which are able to be used on scene analyzer 114. For scene analysis, for example, black-white based method such as machine version, and other technology such as color space analysis, edge detection, clustering, and mathematical transformation such as Fourier transform and Wavelet transform. In addition, area dependent methodology is also applicable. This invention will not restrict to use any kind of these methods.

Figure 2:
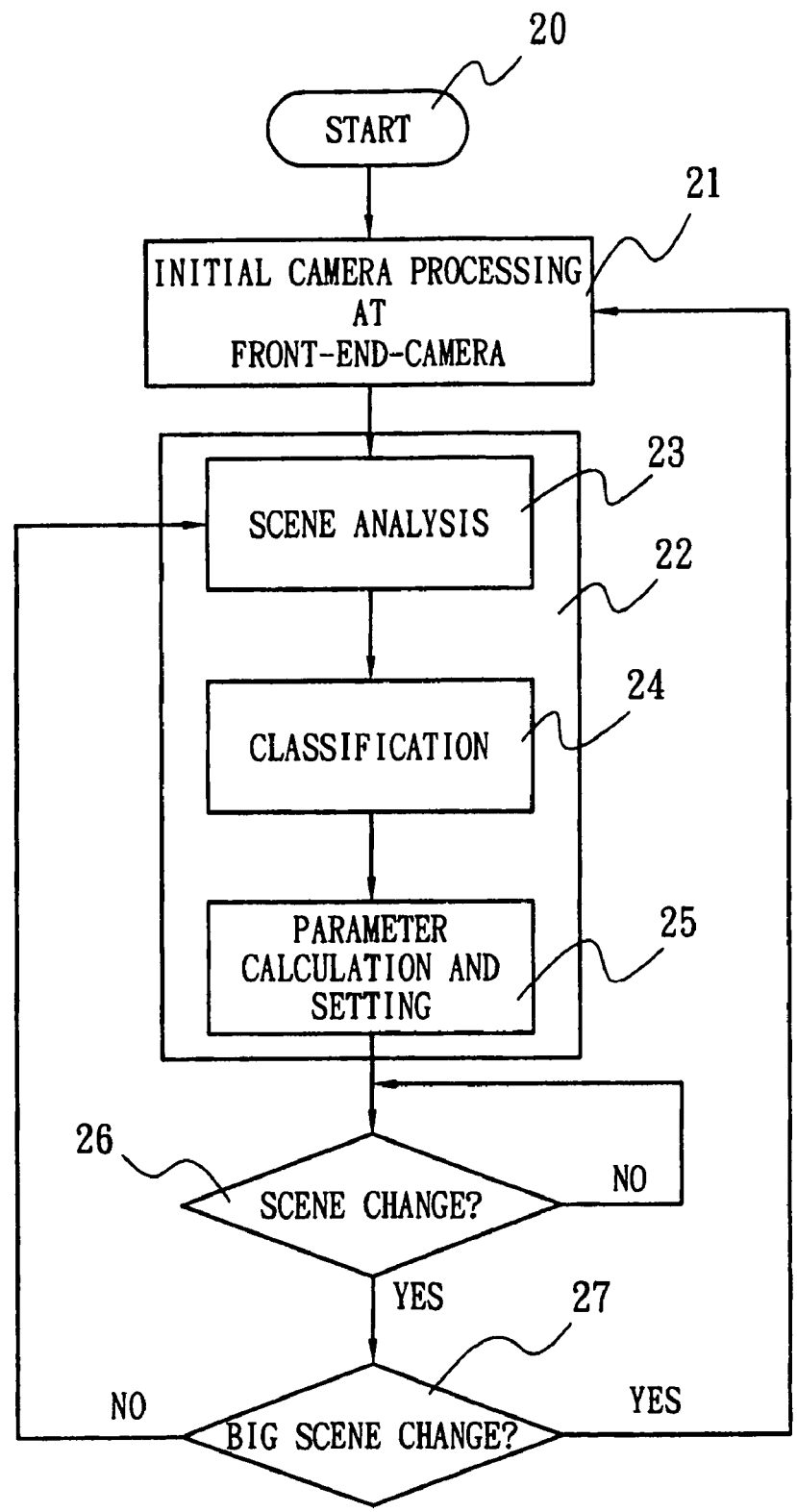
FIG. 2 shows a flowchart of a camera system according to a first embodiment of the present invention.

FIG. 2 shows a flowchart of a camera system according to a first embodiment of the present invention. The flow starts in step 20. After power on, for example, the control state moves to this state. In step 21, the initial camera processing will be done in the front-end camera DSP unit 105, as shown in FIG. 1. In the front-end camera DSP unit 105, some features are extracted at the measure unit 111 and sent to the DSP unit 112, where the initial and crude parameters are calculated and set into the parameter register 113. After the initial camera processing, the process moves to the back-end processor unit 107. The processes in steps 23, 24 and 25 are precise camera processing which in turn involve scene analysis, classification, and parameter calculation and setting, as described with respect to FIG. 1. After step 25, the control sequence will check the scene change in step 26. If there is no scene change, the same parameter value will remain, and the control sequence will keep checking the scene change periodically. If there is a scene change, the control sequence will check the level of the scene change in step 27. In case the level of the scene change is not so big, the control sequence will return to the scene analyzer 114, in which the parameters are adjusted based on scene analysis (step 23) and classification (step 24). If the level of the scene change is big, the control sequence moves on to the front-end camera DSP unit 105 (step 21), in which another crude adjustment of camera parameters is performed. In this embodiment, the scene change is detected at the back-end processor unit 107. The back-end processor unit 107 is provided with means for detecting a scene change after the parameters are set, and means for detecting the level of the scent change if there is a scent change. However, for a fast response, the scene detector can be provided in the front-end camera DSP unit 105. When the scene detector detects a scene change and the level of the scene change, an interrupt generator can be provided to send an interrupt from the front-end camera DSP unit 105 to the back-end processor unit 107. After getting the interrupt, the control sequence in the back-end processor unit 107 will move to an interrupt routine to perform judgment.

Figure 3:
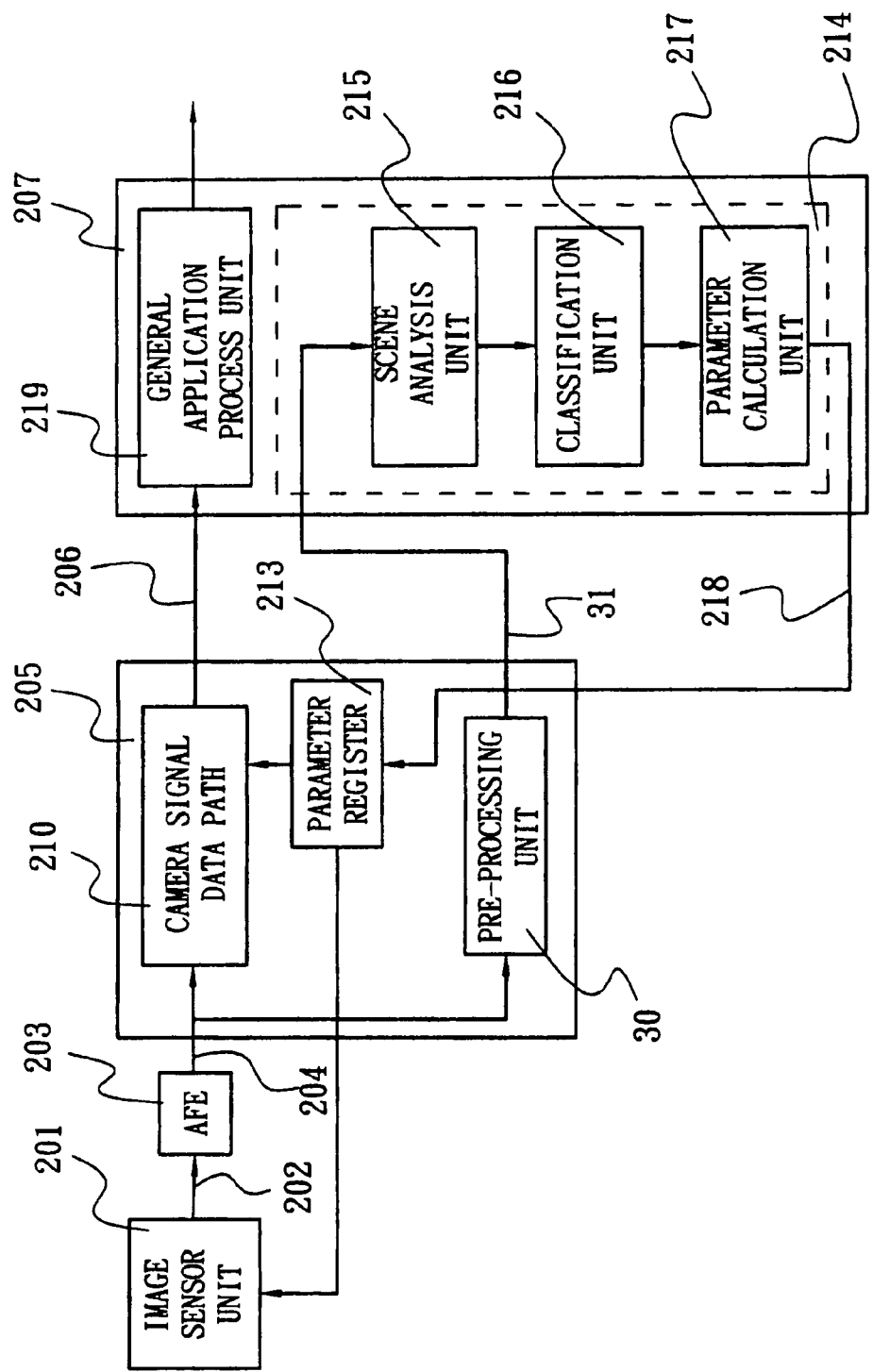
FIG. 3 shows a block diagram of a camera system according to a second embodiment of the present invention.

FIG. 3 shows a block diagram of a camera system according to a second embodiment of the present invention. The basic configuration is the same as that of the first embodiment shown in FIG. 1. The camera system according to the second embodiment comprises an image sensor unit 201, an AFE unit 203 for digitalizing an analog output signal 202 output from the image sensor unit 201 into an digital video signal 204, a front-end camera DSP unit 205, and a back-end processor unit 207 to which a video signal 206 output from camera signal data path 210 is input. The front-end camera DSP unit 205 includes a camera signal data path 210 for accepting the digital video signal 204, a preprocessing unit 30 operably connected to the camera signal data path 210 for processing RAW video input signal, a parameter register 213 operably connected to the camera signal data path 210 and the image sensor unit 201. The back-end processor unit 207 includes a general application process unit 219 for processing the video signal 206 and a scene analyzer 214 operably connected to the pre-processing unit 30 and parameter register 213.

It is noted that the measure unit 111 and DSP 112 have been removed from the front-end camera DSP unit 205 in this embodiment. Instead, the pre-processing unit 30 has been added for processing RAW video input signal to generate a pre-processed video signal 31 to the back-end processor unit 207. Pure RAW signal can be sent to the back-end processor unit 207 directly. In this embodiment, some sort of processing such as defect compensation or transformation from RAW to Bit Map data is expected to reduce processor load on the back-end processor unit 207.

The scene analyzer 214 includes a scene analysis unit 215 operably connected to the pre-processing unit 30 for extracting information including features, a classification unit 216 operably connected to the scene analysis unit 215 for defining the present scene situation based on the information including features extracted by the scene analysis unit 214, a parameter calculation unit 217 operably connected to the classification unit 216 for calculating the input from the classification unit 216 and sending signal 218 as parameters to be set into the front-end camera DSP unit 205. The scene analysis unit 215 extracts multi-dimensional features for the scene and outputs a set of features for being used for scene understanding which is useful for camera processing. The classification unit 216 is used to classify the scene itself with the information from the scene analysis unit 215 by using statistical pattern classification or neural network type decision, and outputs description on the scene which will be input to the parameter calculation unit 217. The parameter calculation unit 217 calculates the input from the classification unit 216 and output signal 218 as actual parameters which are to be set into the front-end camera DSP UNIT 205. The parameter register 213 accepts the signal 218 as parameters output from the parameter calculation unit 217. The pre-processing unit 30 is operably connected to AFE unit 203 and the scene analysis unit 215 for processing RAW video input signal and generating a pre-processed video signal 31 to the scene analysis unit 215.

In the first embodiment of this invention, the video signal output from camera processing unit is used. This makes some kind of loop of process. In the second embodiment, however, the scene analyzer 114 uses un-processed data for scene analysis and classification and sets the parameter into the front-end camera DSP unit 205. There is no loop of process in control sequence and data path except iris and focus of lens in the camera unit.

Figure 4:
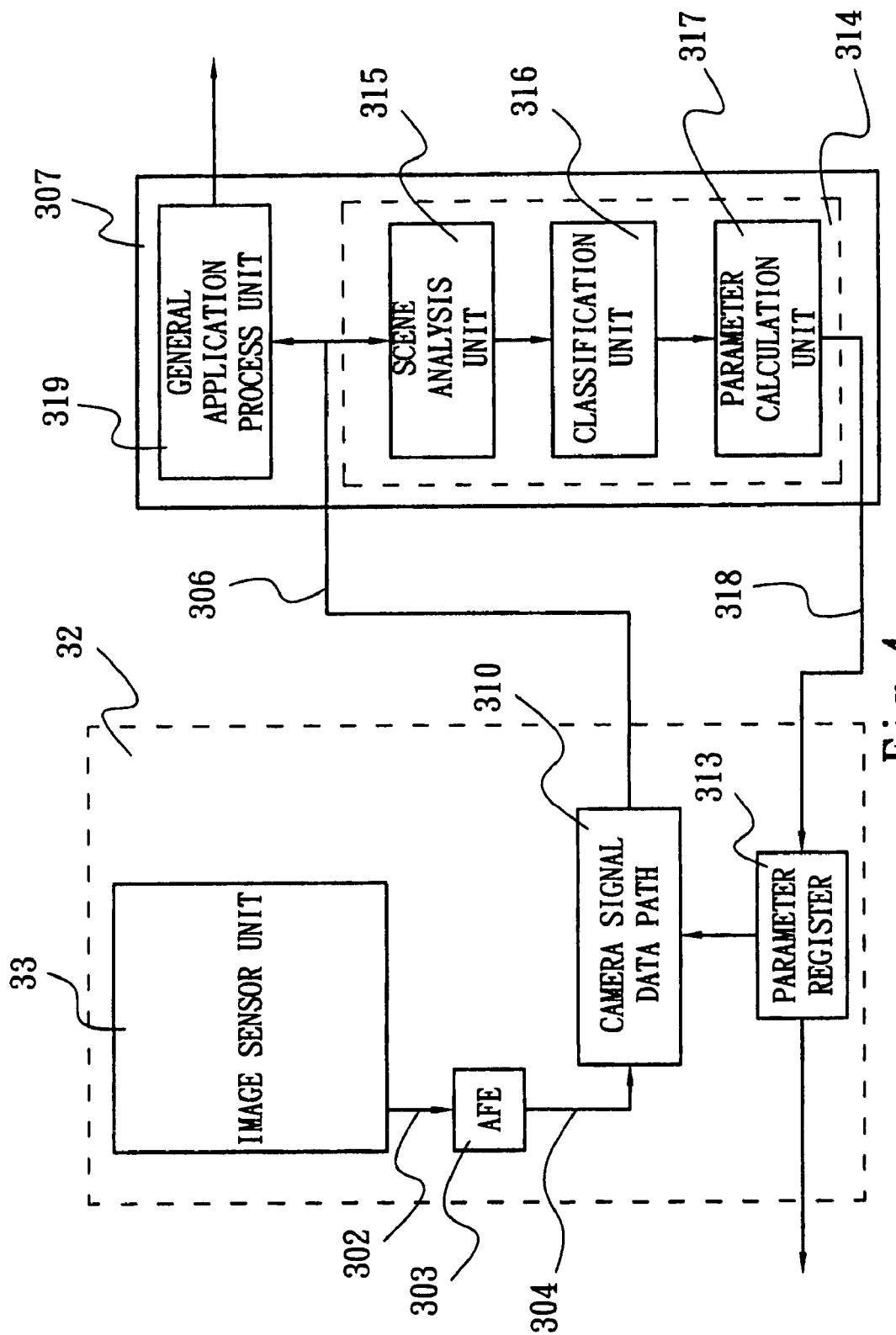
FIG. 4 shows a camera system according to a third embodiment of the present invention.
Figure 5:
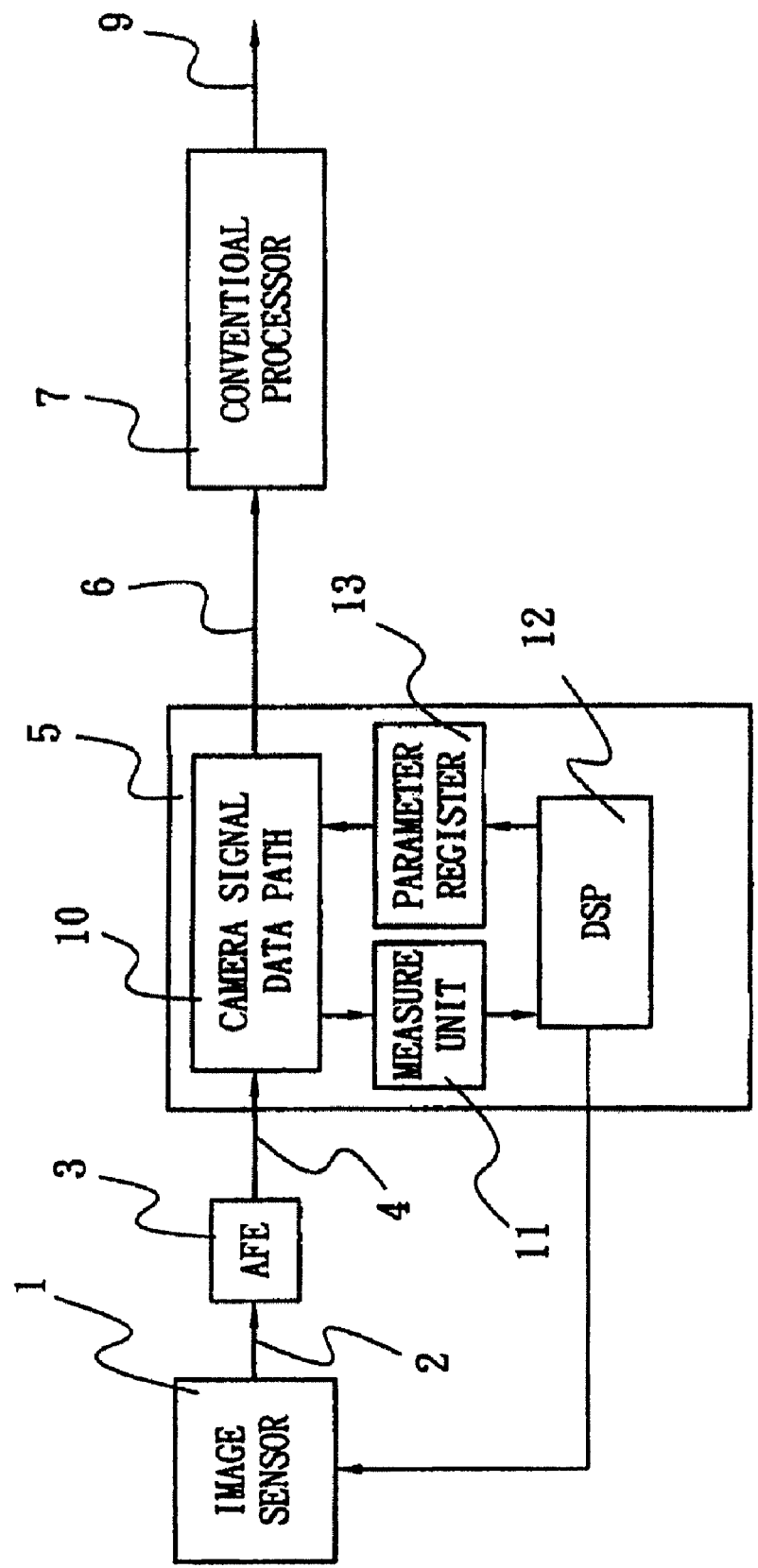
FIG. 5 shows an example of a conventional typical camera system.

FIG. 4 shows a camera system according to a third embodiment of the present invention. In this embodiment, the camera system comprises an image sensor device 32 and a back-end processor unit 307 to which a video signal 306 output from the camera signal data path 310 is input. The image sensor device 32 includes an image sensor unit 33, an AFE unit 303 operably connected to the image sensor unit 33, a camera signal data path 310 for accepting the digital video signal 304, and a parameter register 313 operably connected to the camera signal data path 310. The back-end processor unit 307 includes a general application process unit 319 for processing the video signal 306 and a scene analyzer 314 operably connected to the general application process unit 319 and the parameter register 313 for initial and precise camera processing. The scene analyzer 314 includes a scene analysis unit 315 for extracting information including features, a classification unit 316 operably connected to the scene analysis unit 315 for defining the present scene situation based on the information including features extracted by the scene analysis unit 314, a parameter calculation unit 317 operably connected to the classification unit 316 for calculating the input form the classification unit 316 and sending signal 318 as parameters to be set into the parameter register 313. The scene analysis unit 315 extracts multi-dimensional features for the scene and outputs a set of features for being used for scene understanding which is useful for camera processing. The classification unit 316 is used to classify the scene itself with the information from the scene analysis unit 315 by using statistical pattern classification or neural network type decision, and outputs description on the scene which will be input to the parameter calculation unit 317. The parameter calculation unit 317 calculates the input from the classification unit 316 and outputs signal 318 as actual parameters which are to be set into the parameter register 313.

In this embodiment, the front-end camera DSP is integrated into an image sensor device 32 like an LSI chip. If case of CMOS sensor, it is not hard to integrate MOS analog block such as ADC and logic circuit. This example shows a simpler case, in which only camera signal data path 310 and parameter register 313 are integrated from previous example. The pre-processing unit 30 is omitted. In this example, there is no pre-processing of camera processing. Instead, the scene analyzer 314 is also used for the initial adjustment.

The requirement for camera processing changes based on the application. Sometimes there is a requirement for integrating a new technology of camera processing onto the existing camera system. The camera signal data path unit can be designed in order to keep general functions as well as be able to support versatile processes on video signal. When using powerful back-end processor, this system can realize an intelligent system. However, when cost reduction is needed, the cheaper back-end processor is adaptable. With this one type of CMOS imager, many types of system can be built based on the system requirements.

This system can support any kind of camera processing, not only existing functions but also advanced features. The camera signal data path is realized with flexible hardware. By increasing the processor, these camera processing functions may be able to realized with software. But in this example, the hardwired example of data path has been intentionally explained to show the shift of software weight onto higher level and intelligence process such as scene analysis, classification and so on. In addition to power reduction, hardware realization of data path part is suitable.

The scene analyzing is done with software on the post processor. This makes the system design keep flexibility If a higher-level process is required for higher quality, the system can select higher performance processor. If cost reduction is required, cheaper back-end processor can be used.

In the third embodiment of this invention, only the flexible and general data path is the logic integrated into the CMOS sensor. And with this data path, a wide range of system with just one type of image sensor can be realized.

In case of the first embodiment, the scene analyzer can use the video encoder's information for scene analysis. For instance, a motion vector is a good example for detecting the change of scene. By using the back-end processor for scene analysis, compression process's information can be used for camera processing.

It should be understood by those skilled in the art that various modifications, combinations, sub-combinations and alternations may occur depending on design requirements and other factors insofar as they are within the scope of the appended claims or the equivalents thereof.

The invention claimed is:

1. A camera system apparatus, comprising:
    an image sensor unit;
    an analog front end unit for digitizing an analog output signal output from the image sensor unit into a digital video signal;
    a front-end camera digital signal processor unit, including:
        a camera signal data path for accepting the digital video signal,
        a measure unit connected to the camera signal data path for measuring picture characteristics,
        a digital signal processor for processing the picture characteristics measured by the measure unit as parameters for camera control, and
        a parameter register into which the parameters are set to control the camera signal data path; and
    a back-end processor unit to which a video signal output from the camera signal data path is input, the back-end processor including a general application process unit for processing the video signal and a scene analyzer connected to the general application process unit, wherein the scene analyzer includes:
    a scene analysis unit for extracting information,
    a classification unit connected to the scene analysis unit for defining the present scene situation based on the information extracted by the scene analysis unit, and
    a parameter calculation unit connected to the classification unit for calculating the input from the classification unit and sending signal as parameters to be set into the front-end camera digital signal processor unit,
    wherein signal output from the scene analyzer is set into the parameter register as the parameters to control the camera signal data path.

2. The camera system apparatus according to claim 1, wherein the scene analyzer further includes:
    a scene detecting unit for detecting a scene change after the parameters are set, and
    a level detecting unit for detecting the level of the scene change if there is a scene change.

3. The camera system apparatus according to claim 2, wherein the scene analysis unit extracts multi-dimensional features for the scene and outputs a set of features for being used for scene understanding.

4. The camera system apparatus according to claim 2, wherein the classification unit is used to classify the scene itself with the information from the scene analysis unit by using statistical pattern classification, and outputs description on the scene which will be input to the parameter calculation unit.

5. The camera system apparatus according to claim 2, wherein the parameter calculation unit calculates the input from the classification unit and outputs signal as parameters which are to be set into the front-end camera digital signal processor unit.

6. The camera system apparatus according to claim 2, wherein the front-end camera digital signal processor accepts the signal as parameters output from the parameter calculation unit and sets the parameters into the parameter register.

7. The camera system apparatus according to claim 2, wherein the scene detecting unit is connected to the parameter calculation unit and the level detecting unit.

8. The camera system apparatus according to claim 2, wherein the level detecting unit is connected to the scene detecting unit and the scene analysis unit for controlling the flow of the camera processing, which is to be handed on to the front-end camera digital signal processor unit, or is to be handed on to the scene analyzer to adjust the parameters for camera processing depending on an amount of the scene change.

9. The camera system apparatus according to claim 1, wherein the front-end camera digital signal processor unit further including:
 a scene detecting unit for detecting a scene change after the parameters are set,
 a level detecting unit for detecting the level of the scene change if there is a scene change, and
 an interrupt generator connected to the level detecting unit for generating and sending interrupt to the scene analyzer.

10. A camera system apparatus comprising:
 an image sensor unit;
 an analog front end unit for digitizing an analog output signal output from the image sensor unit into a digital video signal;
 a front-end camera digital signal processor unit, including:
  a camera signal data path for accepting the digital video signal,
  a pre-processing unit connected to the camera signal data path for processing RAW video input signal, and
  a parameter register connected to the camera signal data path and the image sensor unit; and
 a back-end processor unit to which a video signal output from camera signal data path is input, the back-end processor unit including a general application process unit for processing the video signal and a scene analyzer connected to the pre-processing unit and parameter register, wherein the scene analyzer includes:
  a scene analysis unit connected to the pre-processing unit for extracting information,
  a classification unit connected to the scene analysis unit for defining the present scene situation based on the information extracted by the scene analysis unit, and
  a parameter calculation unit connected to the classification unit for calculating the input from the classification unit and sending signal as parameters to be set into the front-end camera digital signal processor unit,
 wherein signal output from the scene analyzer is set into the parameter register as the parameters to control the camera signal data path.

11. The camera system apparatus according to claim 10, wherein the scene analysis unit extracts multi-dimensional features for the scene and outputs a set of features for being used for scene understanding.

12. The camera system apparatus according to claim 10, wherein the classification unit is used to classify the scene itself with the information from the scene analysis unit by using statistical pattern classification, and outputs description on the scene which will be input to the parameter calculation unit.

13. The camera system apparatus according to claim 10, wherein the parameter calculation unit calculates the input from the classification unit and output signal as parameters which are to be set into the front-end camera digital signal processor.

14. The camera system apparatus according to claim 10, wherein the parameter register accepts the signal as parameters output from the parameter calculation unit.

15. The camera system apparatus according to claim 10, wherein the pre-processing unit is connected to the analog front end unit and the scene analysis unit for processing RAW video input signal and generating a pre-processed video signal to the scene analysis unit.

16. A camera system apparatus comprising:
 an image sensor device, including an image sensor unit, an analog front end unit connected to the image sensor unit, a camera signal data path for accepting the digital video signal, and a parameter register connected to the camera signal data path; and
 a back-end processor unit to which a video signal output from the camera signal data path is input, the back-end processor including a general application process unit for processing the video signal and a scene analyzer connected to the general application process unit and the parameter register for camera processing, wherein the scene analyzer includes:
  a scene analysis unit for extracting information,
  a classification unit connected to the scene analysis unit for defining the present scene situation based on the information extracted by the scene analysis unit, and
  a parameter calculation unit connected to the classification unit for calculating the input from the classification unit and sending signal as parameters to be set into the parameter register
 wherein signal output from the scene analyzer is set into the parameter register as the parameters to control the camera signal data path.

17. The camera system apparatus according to claim 16, wherein the scene analysis unit extracts multi-dimensional features for the scene and outputs a set of features for being used for scene understanding.

18. The camera system apparatus according to claim 16, wherein the classification unit is used to classify the scene with the information from the scene analysis unit by using statistical pattern classification, and outputs description on the scene which will be input to the parameter calculation unit.

19. The camera system apparatus according to claim 16, wherein the parameter calculation unit calculates the input from the classification unit and outputs signal as parameters which are to be set into the parameter register.

* * * * *